Oct. 14, 1947. F. L. SARGENT ET AL Re. 22,928
TIRE RACK
Original Filed June 8, 1945 2 Sheets-Sheet 1
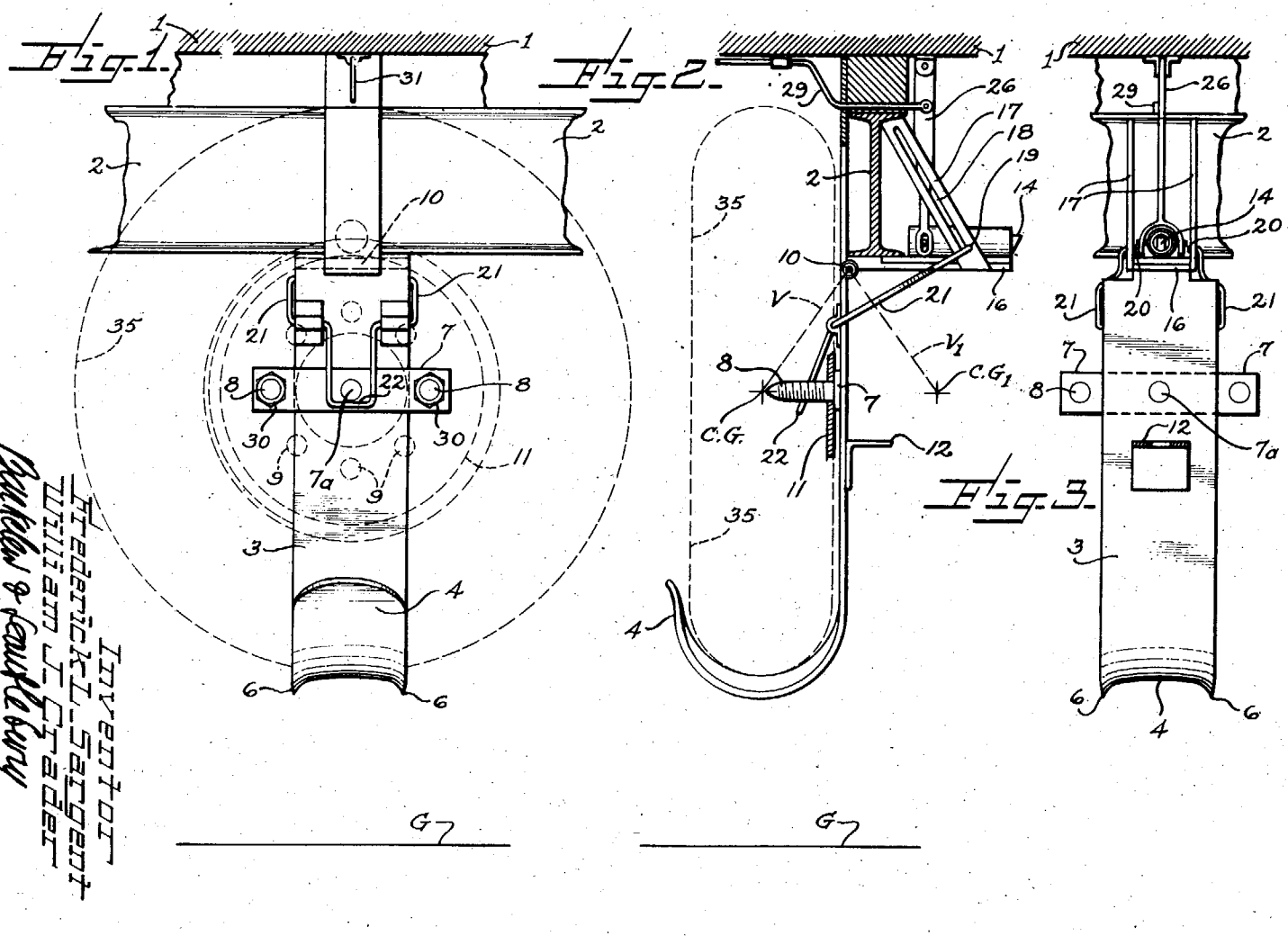
Inventor
Frederick L. Sargent
William J. Crader
Buckelew & Leavitt Berry
Attys.

Oct. 14, 1947. F. L. SARGENT ET AL Re. 22,928

TIRE RACK

Original Filed June 8, 1945 2 Sheets-Sheet 2

Inventor
Frederick L. Sargent
William J. Crader
Burkelew & Scantlebury
Attys.

Reissued Oct. 14, 1947

Re. 22,928

UNITED STATES PATENT OFFICE 22,928

TIRE RACK

Frederick L. Sargent, Burlingame, and William J. Crader, Mountain View, Calif.

Original No. 2,404,534, dated July 23, 1946, Serial No. 598,248, June 8, 1945. Application for reissue April 11, 1947, Serial No. 740,756

7 Claims. (Cl. 224—29)

The present invention relates to improvements in a tire rack for motor vehicles and more particularly to that type of rack for holding ponderous tires used upon heavy trucks and trailers, wherein a stirrup pivotally suspended to a low level to facilitate loading or unloading of a bulky tire, operates in conjunction with releasable means for holding said rack in vertical or loading position and also with means for swinging and locking said rack and tire to a higher elevation without lifting the entire weight of said tire.

The primary object of the present invention is to provide a new and improved tire rack.

Another object is to provide a new and improved rack of the character set forth having a greatly simplified construction for swinging a ponderous tire from a low to a higher elevation and locking the same in such elevation.

A further object is to provide a new and improved tire rack of the type described arranged to facilitate loading and unloading of cumbersome and ponderous commercial truck and trailer tires within the low and comparatively restricted and inaccessible area beneath a truck or trailer body and between the chassis and extensive overhang of the body usually found in vehicles of the heavy commercial type.

We accomplish these and other objects by means of the improved device disclosed in the drawings forming a part of the present application, and in which:

Fig. 1 is a broken elevation of a portion of one side of a truck or trailer body, with the device shown in loading position;

Fig. 2 is a side elevation of Fig. 1, with the tire securing nuts removed;

Fig. 3 is a rear elevation of Fig. 2;

Figure 4:
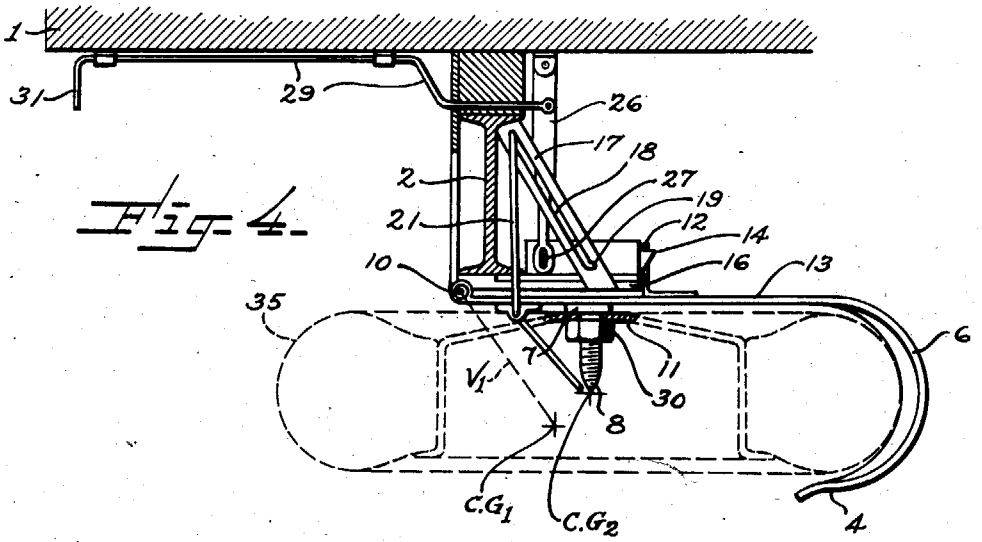
Fig. 4 is an elevation similar to Fig. 1 but showing the rack and tire swung and secured in carrying position.
Figure 5:
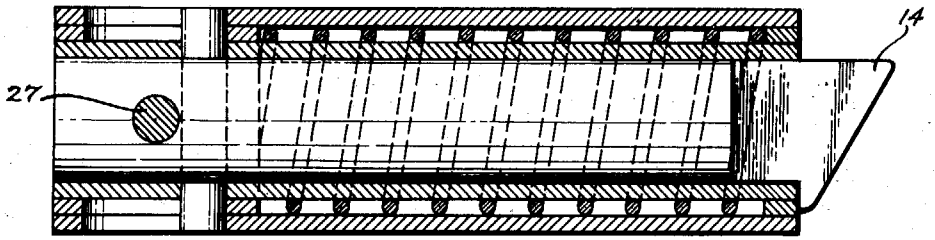
Fig. 5 is an enlarged longitudinal sectional view of one form of latch or bolt which may be used for locking the rack in receded position.

Referring to the drawings:

The numeral 1 is used to designate in general a portion of a heavy commercial truck or trailer body supported upon the usual beam or channel forming a part of the chassis 2.

From the chassis 2 is pivotally suspended a stirrup 3 having a U-shaped lower end 4 flared at its edges as at 6 to facilitate rolling a ponderous tire 35 onto said stirrup 3. The stirrup 3 is also provided with a pivotally mounted transverse bar 7 having tapered and threaded lugs thereon for engaging the usual bolt-holes 9 within a tire mounting 11.

A lateral apertured hasp 12 is mounted upon the rear of the stirrup 3 and is arranged to be automatically engaged and held by a spring bolt or latch 14 when the stirrup 3 is swung upwardly on its pivot to a horizontal or storing position, as fully disclosed in Fig. 4 of the drawings. The latch 14 is preferably mounted upon a lateral shelf 16 on the chassis 2 and further supported by brackets 17 having longitudinally disposed slots 18 therein with offset portions 19 in the lower ends thereof, said slots being slidably engaged by the lateral or inwardly turned ends 20 of a preferably U-shaped brace 21 pivotally mounted upon the stirrup 3 and having an extension 22 by means of which said brace 21 may be released from the offset portions 19 of the slots 18, in a manner and for a purpose hereinafter more fully set forth.

An arm 26 is pivotally suspended from the body 1 and directly above the latch 14 and is provided on the lower end thereof with a slotted and bifurcated end to straddle the latch 14 and engage a releasing pin 27 extending through said bolt or latch 14. Also, a releasing rod 29 is slidably mounted upon the lower or under side of the body 1 and has its inner end pivotally connected to the arm 26, and its outer end terminating in a lateral extension or handle 31 immediately adjacent the side of the body 1, as disclosed in Fig. 4 of the drawings.

In operation; with the stirrup 3 vertically suspended as in Fig. 1 of the drawings, one edge of a ponderous tire 35 is raised and laid upon or rolled into the U-shaped end 4 of the stirrup 3, so that an operator, within the comparatively restricted area under a body 1 and between the chassis or frame 2 and outer side or edge of the body 1, will not be compelled to lift the entire weight of said tire. Having rested one edge of the tire 35 upon the U-shaped portion 4 of the stirrup 3, the tire 35 is then raised vertically and the bolts 8 are inserted into the nearest holes 9 of a tire mounting 11, the bar 7 mounting said bolts 8 being pivotal so that the bolts easily may be adjusted to the holes rather than the more laborious method of turning the heavy tire to bring the holes 9 into matching relation with said bolts 8, as shown schematically in Fig. 1 of the drawings.

After the nuts 30 are screwed upon their respective bolts 8 the tire 35 and stirrup 3 are pulled forwardly until the ends 20 of the brace 21 are out of the offset portions 19 of the slots 18 of the braces 17, which brace 21 has been holding the stirrup 3 against backward movement while being loaded. The extension 22 of said brace 21, which normally extends through the central or axle opening of the tire mounting 11, is now pressed by the foot of an operator or otherwise to move the ends 20 of the brace 21 upwardly into the slots 18 and beyond the offset portions 19 thereof, so that the stirrup 3 and tire 35 thereon may now be swung upwardly to a horizontal position and until the latch or bolt 14 engages and holds the hasp 12, as fully disclosed in Fig. 4 of the drawings. In this carrying position, the tire is held beneath the truck body 1 out of danger from collisions and sufficiently clear of the roadway below.

When it is desired to unload a spare tire 35 from the rack, by pulling the handle 31 of the rod 29 outwardly, the latch or bolt 14 is receded or withdrawn from the apertured hasp 12 and the stirrup 3 and tire 35 will be moved automatically by the attraction of gravity to a substantially vertical or unloading position, as clearly disclosed in Figs. 1 and 2 of the drawings. In these figures it will be observed that the ponderous tire 35 has been lowered closely to the ground, as represented by the line G, so that with little effort the said tire may be removed and rolled off the side of the U-shaped portion 4 of the stirrup 3 and onto the ground G.

Several further observations may be made on the structure and functions of the devices illustrated in the drawing and described in the foregoing. Pivot 10, from which stirrup 3 (the tire supporting element) is suspended, is shown as located near the outer lower edge of the chassis frame member 2. It may be conveniently carried by the shelf 16 which is secured under frame member 2. Pivot 10 is located substantially in the plane of the vertical depending portion 3 of the stirrup. The tire or wheel securing means (bar 7 with its studs 8) secures the wheel substantially against stirrup portion 3 so that the plane of the inner face of the tire is close to the pivot 10. That relative arrangement results in the tire lying closely under the chassis frame 2 when the parts are swung to the position of Fig. 4.

The central pivot 7a of the wheel securing bar 7 is located on the outer face of stirrup 3 in a position below stirrup pivot 10. The axis of that pivot coincides with the axis of the secured wheel. (The wheel is supported by stirrup part 4 with the wheel axis in substantially that same position, for convenience in securing the wheel.) The physical center and the substantially coincident center of gravity of the secured tire and tire mounting consequently lie below the suspension pivot 10, and also (in Fig. 2) outwardly displaced from the suspension pivot by approximately the half thickness of the tire.

In Fig. 2 the approximate position of the center of gravity is indicated by the cross mark designated C. G. and a line joining pivot 10 and C. G. is designated V.

Brace 21 in the position of Fig. 2 holds the stirrup and tire in the vertical position, preventing them from swinging back toward a position where line V would be vertical. On release of the holding brace, the stirrup and tire will swing under gravity to the position where line V is vertical and on through that position toward a position where that line is in position $V_1$ and where C. G. is in position C. G.1. A relatively slight assisting manual effort applied to the tire swings the stirrup and tire from the last mentioned position to the final stowed position of Fig. 4, the weight of the stirrup and tire only having to be lifted manually from the lever of C. G.1 to that of C. G.2. Upon reaching the stowed position of Fig. 4, latch 14 automatically catches in hasp 14 to hold the stirrup and tire until the latch is released.

When the tire is wanted and the latch is released, the stirrup and tire will swing under gravity from the position of Fig. 4 fully to the position of Fig. 2 because the position designated C. G. is lower than C. G.2. On reaching the position of Fig. 2, brace 21 dropping down slot 18 catches in the lower end of the slot to hold the stirrup and tire in that position.

We claim:

1. A tire rack comprising the combination with a vehicle body of a stirrup pivotally suspended from the chassis of said body; tapered and threaded lugs adjustably mounted upon said stirrup and arranged to engage apertures within a tire mounting mounted upon said stirrup; a hasp mounted upon the back of said stirrup; a latch arranged to engage said hasp and retain the same to hold said stirrup in a horizontal position from its pivot when said stirrup is swung to such position; means extending from said latch to the side of said vehicle body for releasing said latch; and releasable means for holding said stirrup in suspended vertical position.

2. A tire rack of the type adapted to carry a tire in a position beneath a vehicle frame, said rack comprising a tire supporting element, means for pivotally suspending the supporting element from a pivotal point adjacent the lower outer edge of the vehicle frame so that the supporting element may be swung between a position of substantially vertical suspension below the pivot point and a position in which it extends from the pivot inwardly and substantially horizontally under the vehicle frame, means for securing a tire to that side of the supporting element which is outward when the element is in its suspended position, the securing means being so positionally related to the suspension pivot that the plane of the inner face of the secured tire is adjacent the pivot point and the center of mass of the tire lies below and spaced outward from the pivot point, releasable means for holding the supporting element against inward swinging movement from its said position of substantially vertical suspension, and releasable means for holding the supporting element against downward and outward swinging movement from its said substantially horizontal position.

3. A tire rack as defined in claim 2 and in which the tire supporting element comprises at least in part a member in the form of a flat bar attached at one end to the pivot and lying substantially in a plane in which the pivot axis lies, and in which the tire securing means is located on the supporting element at a level below the pivot when the supporting element is in its suspended position.

4. A tire rack as defined in claim 3 and in which the two releasable holding means embody automatic latching devices which are operable by virtue of the supporting element reaching either of its two specified positions.

5. A tire rack as defined in claim 2 and in which the two releasable holding means embody automatic latching devices which are operable by virtue of the supporting element reaching either of its two specified positions.

6. A tire rack as defined in claim 2 and in which the tire supporting element comprises a member in the form of a flat bar attached at one end to the pivot and lying for a portion of its length substantially in a plane in which the pivot axis lies, the opposite end portion of the member being bent in the form of a tire supporting portion which extends outwardly from the lower end of the first mentioned portion when the supporting element is in its suspended position.

7. A tire rack as defined in claim 2 and in which the tire supporting element comprises a member in the form of a flat bar attached at one end to the pivot and lying for a portion of its length substantially in a plane in which the pivot axis lies, the opposite end portion of the member being bent in the form of a tire supporting portion which extends outwardly from the lower end of the first mentioned portion when the supporting element is in its suspended position, and the tire securing means comprising a bar medially pivoted on the outer face of the first mentioned portion of the flat bar member at a point below the suspension pivot, and threaded tire securing elements carried by the ends of the pivoted bar.

FREDERICK L. SARGENT.
WILLIAM J. CRADER.